United States Patent
Hilborn et al.

(10) Patent No.: US 6,218,442 B1
(45) Date of Patent: Apr. 17, 2001

(54) CORROSION RESISTANT STRUCTURAL FOAM

(75) Inventors: Bradley L. Hilborn, Ferndale; Bruce Lee Harrison, Sterling Heights, both of MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/638,352

(22) Filed: Aug. 15, 2000

Related U.S. Application Data

(62) Division of application No. 09/313,592, filed on May 18, 1999, now Pat. No. 6,103,784.
(60) Provisional application No. 60/098,110, filed on Aug. 27, 1998.

(51) Int. Cl.$^7$ ........................................... C08J 9/06
(52) U.S. Cl. ........................ 521/85; 521/93; 521/107; 521/124; 521/135; 521/178; 523/219
(58) Field of Search ..................... 523/219; 521/85, 521/93, 107, 124, 135, 178

(56) References Cited

U.S. PATENT DOCUMENTS

| | | | |
|---|---|---|---|
| 2,739,134 | 3/1956 | Perry et al. | 521/178 |
| 2,984,641 | 5/1961 | Wolinski | 260/41 |
| 3,154,504 | 10/1964 | Carey et al. | 521/178 |
| 3,756,984 | 9/1973 | Klaren et al. | 260/47 |
| 4,066,625 | 1/1978 | Bolger | 260/59 |
| 4,069,192 | 1/1978 | Monte et al. | 260/37 |
| 4,080,353 | 3/1978 | Monte et al. | 260/40 |
| 4,087,402 | 5/1978 | Monte et al. | 260/42.14 |
| 4,094,853 | 6/1978 | Monte et al. | 260/40 |
| 4,096,110 | 6/1978 | Monte et al. | 260/40 |
| 4,098,758 | 7/1978 | Monte et al. | 260/42.14 |
| 4,122,062 | 10/1978 | Monte et al. | 260/42.14 |
| 4,192,792 | 3/1980 | Sugarman et al. | 260/42.14 |
| 4,261,913 | 4/1981 | Monte et al. | 260/429.5 |
| 4,268,656 | 5/1981 | Ray-Chaudhuri et al. | 528/103 |
| 4,360,649 | 11/1982 | Kamio et al. | 525/484 |
| 4,423,180 | 12/1983 | Brizgys et al. | 524/394 |
| 4,450,221 | 5/1984 | Terada et al. | 430/106.6 |
| 4,512,928 | 4/1985 | Sugarman et al. | 260/410.9 |
| 4,542,202 | 9/1985 | Takeuchi et al. | 528/96 |
| 4,546,155 | 10/1985 | Mirose et al. | 525/504 |
| 4,595,623 | 6/1986 | DuPont et al. | 428/195 |
| 4,600,789 | 7/1986 | Sugarman et al. | 556/17 |
| 4,610,836 | 9/1986 | Wycech | 264/313 |
| 4,623,738 | 11/1986 | Sugarman et al. | 556/17 |
| 4,634,785 | 1/1987 | Sugarman et al. | 556/17 |
| 4,659,848 | 4/1987 | Kay et al. | 556/24 |
| 4,695,343 | 9/1987 | Wycech | 156/196 |
| 4,732,806 | 3/1988 | Wycech | 428/241 |
| 4,751,249 | 6/1988 | Wycech | 521/54 |
| 4,788,235 | 11/1988 | Johnson | 523/451 |
| 4,792,580 | 12/1988 | Doshi | 524/261 |
| 4,861,097 | 8/1989 | Wycech | 296/188 |
| 4,901,500 | 2/1990 | Wycech | 52/793 |
| 4,908,930 | 3/1990 | Wycech | 29/527.2 |
| 4,922,596 | 5/1990 | Wycech | 29/897.2 |
| 4,923,902 | 5/1990 | Wycech | 521/54 |
| 4,931,490 | 6/1990 | Armendiades | 523/218 |
| 4,978,562 | 12/1990 | Wycech | 428/35.8 |
| 4,995,545 | 2/1991 | Wycech | 228/119 |
| 5,045,575 | 9/1991 | Gabayson | 523/458 |
| 5,124,186 | 6/1992 | Wycech | 428/35.8 |
| 5,134,239 | 7/1992 | Bertram et al. | 546/112 |
| 5,274,006 | 12/1993 | Kagoshima et al. | 521/85 |
| 5,340,946 | 8/1994 | Friedrich et al. | 174/256 |
| 5,407,978 | 4/1995 | Bymark et al. | 523/457 |
| 5,430,112 | 7/1995 | Sakate et al. | 525/526 |
| 5,439,977 | 8/1995 | Yokota et al. | 525/113 |
| 5,453,453 | 9/1995 | Lamon | 521/54 |
| 5,464,910 | 11/1995 | Nakatsuke et al. | 525/486 |
| 5,470,886 | 11/1995 | Makhlouf et al. | 521/59 |
| 5,543,486 | 8/1996 | Abe et al. | 528/92 |
| 5,548,058 | 8/1996 | Murof et al. | 528/93 |
| 5,575,526 | 11/1996 | Wycech | 296/205 |
| 5,707,571 | 1/1998 | Reedy | 264/45.3 |
| 5,712,317 | 1/1998 | Makhlouf et al. | 521/76 |
| 5,717,011 | 2/1998 | Griggs et al. | 523/414 |
| 5,733,954 | 3/1998 | McKenzie et al. | 523/414 |
| 5,755,486 | 5/1998 | Wycech | 296/188 |
| 5,789,498 | 8/1998 | Ohnishi et al. | 525/526 |
| 5,798,399 | 8/1998 | Griggs et al. | 523/414 |
| 5,801,218 | 9/1998 | McKenzie et al. | 523/414 |
| 5,804,608 | 9/1998 | Nakazaro et al. | 521/135 |
| 5,859,096 | 1/1999 | Hoge | 523/427 |
| 5,996,167 | 12/1999 | Close | 15/230.12 |
| 6,040,350 | 3/2000 | Fukui | 521/135 |

OTHER PUBLICATIONS

Encyclopedia of Polymer Science & Engineering, vol. 6, pp. 322–382 (1986).

*Primary Examiner*—Morton Foelak
(74) *Attorney, Agent, or Firm*—Wayne C. Jaeschke; Stephen D. Harper

(57) ABSTRACT

Titanates and zirconates bearing organic substituents can act as corrosion inhibitors when added to foamable compositions based on thermosettable synthetic resins such as epoxy resins. Combinations of organometallates containing certain specific types of substituents provide synergistic improvements in the properties of structural reinforcement foams obtained by heating and curing the foamable compositions.

27 Claims, No Drawings

CORROSION RESISTANT STRUCTURAL FOAM

This application claims priority from provisional application Serial No. 60/098,110, filed Aug. 27, 1998, and is a divisional of Ser. No. 09/313,592, filed May 18, 1999, now U.S. Pat. No. 6,103,784.

BACKGROUND OF THE INVENTION

1. Field of The Invention

The invention relates to a foam that resists corrosion and that is useful for reinforcing structural members and the like.

2. Discussion of the Related Art

It is known that a number of industries, e.g., the automobile industry, require parts that are both strong and lightweight. One attempt to achieve this balance between strength and minimal weight provides for hollow metal parts. However, hollow metal parts are easily distorted. Accordingly, it is also known that the presence of structural foam in the cavities of the hollow parts can improve strength and stiffness of such parts.

Generally, such foams comprise a thermosettable resin such as an epoxy resin, a blowing agent and a filler such as hollow glass microspheres. Preferably, these foams have a density of about 20–40 lb/ft$^3$ (about 0.30–0.65 g/cc) and are able to withstand heat in excess of 175° C., most preferably in excess of 200° C. Optional ingredients include curatives, processing aids, stabilizers, colorants, and UV absorbers.

Specific formulas for structural foam can vary widely. For example, U.S. Pat. No. 5,575,526 teaches several structural foams based on polyester and epoxy resins. U.S. Pat. No. 5,755,486 discloses thermally expandable resin-based materials containing, for example, epoxy resin, acrylonitrile-butadiene rubber, calcium carbonate, carbon black, fumed silica, glass spheres, curing agent, accelerator, and blowing agent. Structural reinforcement foams such as, e.g., TERO-CORE® (a product of Henkel Surface Technologies) are now used in a variety of industries.

One characteristic of structural reinforcement foams is that they start as expandable resins that form gas pockets (cells) when cured. When exposed to ordinary environmental conditions, these cells can trap salt and water. Salt and water corrode the metal parts, which are commonly in contact with the foam, and the resulting metal oxide degrades the ability of the foam to adhere to the metal. Eventually, the foam is forced from the metal part, thereby weakening the part.

SUMMARY OF THE INVENTION

Surprisingly, the inventors have found that organometallate compounds selected from the group consisting of organic titanates and organic zirconates can act as corrosion inhibitors when added to structural reinforcement foam formulations. That is, the organometallate compounds reduce the amount of corrosion which takes place on a metal surface (particularly a ferrous metal surface such as steel) in contact with a reinforcing foam.

The foamable compositions comprise, in addition to a corrosion-inhibiting amount of one or more organometallate compounds, one or more thermosettable synthetic resins, one or more curatives, and one or more blowing agents. In one especially advantageous aspect of the invention, the foamable composition is in the form of a pliable dough which additionally contains one or more fillers, particularly hollow glass microspheres.

Synergistic improvements in certain properties can be achieved through the use of a combination of different types of organometallate compounds.

DETAILED DESCRIPTION OF THE INVENTION

Organic titanates and zirconates suitable for use as corrosion inhibitors in the present invention are well known in the art and are described, for example, in the following U.S. Pat. Nos. (each of which is incorporated herein by reference in its entirety): 2,984,641; 4,069,192; 4,080,353; 4,087,402; 4,094,853; 4,096,110; 4,098,758; 4,122,062; 4,192,792; 4,261,913; 4,423,180; 4,450,221; 4,512,928; 4,600,789; 4,623,738; 4,634,785; 4,659,848; 4,788,235; 4,792,580; 5,045,575; and 5,707,571. A number of suitable titanates and zirconates are available from commercial sources, such as Ajinomoto Company, Inc., of Japan under the PLENACT trademark and Kenrich Petrochemicals of Bayonne, N.J. under the KEN-REACT trademark, including NZ-37 (a particularly preferred zirconate), NZ-38, LICA 38, LICA 97, KZTPP, CAPRO L 38/H, KR-238M (a particularly preferred titanate which is an amino(meth)acrylate adduct of a tetra-substituted pyrophosphato titanate; the chemical structure of KR-238M is shown in U.S. Pat. No. 5,340,946, the disclosure of which is incorporated herein by reference in its entirety), KR-55 (a particularly preferred titanate which is a phosphite adduct of a neoalkoxy-substituted titanate; the chemical structure of KR-55 is shown in U.S. Pat. No. 5,045,575, the disclosure of which is incorporated herein by reference in its entirety), KZ-55, KR-41B, KR-46B, KR-TTS, KR-201, KR-33BS, KR-133BS, KR-39BS, KR-139BS, KR-34S, KR-34BS, KR-134S, KR-134BS, KR-44, KR-52S, KR-63S, KR-66S, KR-27S, KR-9S, KR-12, KR-112S, KR-212, KR-38S, KR-138S, KR-2388, KR-58FS, KR-158FS, KR-62ES, KR-262ES, KR-36C, KR-41B, NZ-44, LZ-38 and KR-46B.

Suitable organometallates are characterized in general by having four substituents covalently bonded to titanium or zirconium atoms (i.e., the organometallates are tetrasubstituted) with the four atoms directly bonded to the metal atom being oxygen atoms. As will be discussed in more detail hereinafter, the metal atoms may optionally be complexed by various types of moieties to form adducts.

It is particularly preferred to use one or more titanates and/or zirconates containing at least one neoalkoxy substituent attached to titanium or zirconium such as those described, for example, in U.S. Pat. Nos. 4,600,789; 4,623,738 and 5,045,575.

The neoalkoxy substituent(s) preferably correspond to the general structure

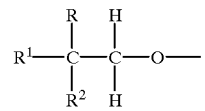

wherein R, R$^1$ and R$^2$ may be the same or different and are each a monovalent alkyl, alkenyl, alkynyl, aralkyl, aryl, or alkaryl group having up to 20 carbon atoms or a halogen or ether substituted derivative thereof. R$^2$ may also be an oxy derivative or an ether substituted oxy derivative of the aforementioned groups. (e.g., C$_1$–C$_3$ alkoxy, phenoxy). In one embodiment, R$^2$ is C$_1$–C$_6$ alkyl and R$^1$ and R$^2$ are allyloxymethyl (—CH$_2$—O—CH$_2$—CH=CH$_2$). The titanate or zirconate may also be an adduct of a phosphite or other phosphorus-containing moiety. Such moeities may be regarded as complexing or chelating agents, wherein certain functional groups in the entity are associated with the metal atom (Ti or Zr) in the titanate or zirconate. The entity may preferably be a mono or di-substituted hydrogen phosphite. Suitable adducts of this type are described, for example, in U.S. Pat. Nos. 4,080,353; 4,261,913; 4,512,928; 4,659,848; 4,788,235; 4,792,580 and 5,045,575.

Another particularly preferred class of organometallate compound includes amine adducts of titanates and zirconates. The metal atom is preferably substituted with at least one phosphorus-containing substituent selected from the group consisting of phosphite, phosphate and pyrophosphate. In a particularly desirable embodiment, the amine portion of the adduct contains an unsaturated carboxylate functionality such as (meth)acrylate. The commercial product KEN-REACT KR-238M titanate (available from Kenrich Petrochemical) is an example of this type of titanate adduct. Amine adducts of titanates and zirconates are also described in U.S. Pat. Nos. 4,512,928 and 5,340,946.

Sufficient organometallate compound is incorporated into the foamable composition so as to reduce the extent of corrosion which occurs when the structural reinforcement foam formed from the foamable composition is placed in contact with the surface of a metal part. The optimum amount of organometallate compound will vary somewhat depending upon the identity of the organometallate compound(s) selected for use and the type of metal surface, among other factors, but may be readily determined by routine experimentation. Total amounts of organometallate compounds in the range of from about 0.1 to about 2 weight of % based on the total weight of the foamable composition will generally be effective, however.

In one embodiment of the invention, at least two different organometallate compounds are utilized. Even more preferably, at least three different organometallate compounds are utilized. The different organometallate compounds are desirably selected from at least two, more preferably three, of the following classes of materials: (a) titanates containing at least one neoalkoxy substituent bonded to titanium and/or at least one phosphite moiety in the form of an adduct, (b) zirconates containing at least one neoalkoxy substituent bonded to zirconium and/or at least one substituted or unsubstituted benzoate group bonded to zirconium, and (c) titanates containing at least one pyrophosphate substituent bonded to titanium and/or at least one amine moiety in the form of an adduct.

A preferred foamable formulation comprises about 0.1 to about 1 weight % (more preferably 0.3 to 0.5 weight %) Uitanates of type (a), about 0.1 to about 1 weight % (more preferably 0.1 to 0.2 wt %) zirconates of type (b) and about 0.1 to about 0.5 weight % (more preferably, 0.2 to 0.3 weight %) titanates of type (c).

In addition to the organometallate compounds which act as corrosion inhibitors, preferred foam formulations contain about 35 weight percent to about 85 weight percent of one or more thermosettable synthetic resins, about 10 weight percent to about 60 weight percent of one or more fillers (with hollow glass microspheres being especially preferred), about 0.1 weight percent to about 5 weight percent of one or more blowing agents, and about 0.1 weight percent to about 15 weight percent of one or more curatives. The foamable composition may also contain effective amounts of other additives such as blowing agent activators, silanes, toughening/flexibilizing agents, thixotropic/rheological control agents, colorants, and stabilizers. It is particularly advantageous to select formulation components which, when mixed together, provide a foamable dough of putty-like consistency which can be readily molded or shaped into any desirable configuration prior to foaming and curing.

While in principle any of the thermosettable synthetic resins known in the art may be employed, including, for example, vinyl esters, thermoset polyesters, urethanes, phenolic resins, and the like, the present invention is especially well-suited for use with epoxy resin-based systems.

Any of the thermosettable resins having an average of more than one (preferably about two or more) epoxy groups per molecule known or referred to in the art may be utilized as the epoxy resin component of the present invention.

Epoxy resins are described, for example, in the chapter entitled "Epoxy Resins" in the Second Edition of the *Encyclopedia of Polymer Science and Engineering*, Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as p-hydroxybenzoic acid or betahydroxy naphthoic acid with epichlorohydrin or the like; polyglycidyl esters obtained by reacting polycarboxylic acids such as phthalic acid, tetrahydrophthalic acid or terephthalic add with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commerical sources are suitable for use in the present invention. Preferably, the epoxy resin has an epoxide equivalent molecular weight of from about 150 to 1000. The use of epoxy resins based on glycidyl ethers of bisphenol A is especially advantageous. The epoxy resin preferably contains an average of about 2 epoxy groups per molecule and should be selected so as to provide the desired combination of properties in both the foamable dough and the final cured foam.

The hardening of the thermosettable synthetic resins utilized in the present invention may be accomplished by the addition of any of the chemical materials known in the art for curing such resins. Such materials are referred to herein as "curatives", but also include the substances known to workers in the field as curing agents, hardeners, activators, catalysts or accelerators. While certain curatives promote curing by catalytic action, others participate directly in the reaction of the resin and are incorporated into the thermoset polymeric network formed by condensation, chain-extension and/or crosslinking of the synthetic resin. Where the thermosettable synthetic resin is an epoxy resin, it is particularly desirable to employ at least one curative which is a nitrogen-containing compound. Such curatives (along with other curatives useful for hardening epoxy resins) are described in the chapter in the *Encyclopedia of Polymer Science and Engineering* referenced hereinabove. Suitable nitrogen-containing compounds useful as curatives include amino compounds, amine salts, and quatemary ammonium compounds. Particularly preferred types of nitrogen-containing compounds include amine-epoxy adducts, imidazoles, ureas, and guanidines. In one desirable embodiment of the invention, two or more different types of these nitrogen-containing compounds are used in combination.

Amine-epoxy adducts are well-known in the art and are described, for example, in U.S. Pat. No. s 3,756,984; 4,066, 625; 4,268,656; 4,360,649; 4,542,202; 4,546,155; 5,134,239; 5,407,978; 5,543,486; 5,548,058; 5,430,112; 5,464,910; 5,439,977; 5,717,011; 5,733,954; 5,789,498; 5,798,399 and 5,801,218, each of which is incorporated herein by reference in its entirety. Such amine-apoxy adducts are the products of the reaction between one or more amine compounds and one or more epoxy compounds. Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted. Preferably, the adduct is a solid which is insoluble in the epoxy resin component of the present invention at room temperature, but which becomes soluble and functions as an accelerator to increase the cure rate upon heating. While any type of amine could be used (with heterocyclic amines and/or amines containing at least one secondary nitrogen atom being preferred), imidazole compounds are particularly preferred. Illustrative imidazoles include 2-methyl imidazole, 2,4-dimethyl imidazole, 2-ethyl-4-methyl imidazole, 2-phenyl imidazole and the like. Other suitable amines include, but are not limited to, piperazines, piperidines, pyrazoles, purines, and triazoles. Any kind of epoxy compound can be employed as the other starting material for the adduct, including monofunctional, bifunctional, and polyfunctional epoxy compounds such as those described previously with regard to the epoxy resin component. Suitable amine-epoxy adducts are available from commercial sources such as Ajinomoto, Inc., Shell, Pacific Anchor Chemical Company, and the Asahi Chemical Industry Company Limited. The products sold by Ajinomoto under the trademarks AJICURE PN-40 and AJICURE PN-23 are especially preferred for use in the present invention.

Dicyandiamide (sold commercially by Air Products under the trademark DICY) is also a particularly preferred curative, although other guanidine compounds may also be utilized. The curative system may also comprise one or more ureas, either alone or in combination with other types of curatives (especially guanidines such as dicyandiamide). Suitable ureas include alkyl and aryl substituted ureas. Many such ureas are available commercially, for example, N,N'-dimethyl urea, which is sold under the trademark AMIC-URE UR by Air Products. Imidazoles, including alkyl and aryl substituted imidazoles such as 2-ethyl-4-methyl imidazole, constitute another class of suitable curatives.

In one desirable embodiment of the invention, dicyandiamide (preferably, about 0.5–8 wt % based on the total weight of the foamable composition) is used in combination with an amine-epoxy adduct (preferably, about 0.1–5 wt %) in the curative system.

The curative system (i.e., the specific curatives and the amounts of such curatives) should be selected such that it does not catalyze curing of the foamable composition to any significant extent under typical storage conditions over an extended period of time. Preferably, the components of the curative system are adjusted such that the foamable composition retains a workable consistency (in one embodiment of the invention, a consistency resembling that of a pliable dough or putty) for more than two weeks at 130° F.) and does not expand in volume or decrease in specific gravity under such conditions to an unacceptable extent, yet foams and cures within 10 minutes upon being heated at 150° C. or higher with no appreciable deterioration in performance during storage.

Selection of the blowing agent or blowing agents to be used in the present invention is not believed to be particularly critical, although chemical blowing agents rather than physical blowing agents are preferred if a storage-stable, ready-to-use one part composition is desired. Any of the chemical blowing agents known in the art may be employed, with azodicarbonamide (also sometimes referred to as 1,1'-azobisformamide, AZDC or ADC) and sulfonyl hydrazides providing particularly good performance. In one embodiment of the invention, azodicarbonamide is utilized as the predominate or, more preferably, sole blowing agent; mixtures with sulfonylhydrazides may be desirable for certain purposes, however. Azodicarbonamide is available from a number of commercial sources; for example, it is sold under the trademark UNICELL by Doug Jin Chemical of South Korea and under the CALOGEN trademark by Uniroyal Chemical. "Activated" or "modified" forms of azodicarbonamide may be used to advantage. Suitable sulfonylhydrazide blowing agents include, but are not limited to, p,p'-oxybis (benzenesulfonylhydrazide) (sold by Uniroyal Chemical under the trademark CELOGEN OT), p-toluenesulfonylhydrazide (sold by Uniroyal Chemical under the trademark CELOGEN TSH) and the like. The particle size of the blowing agent may be adjusted so as to provide the desired foaming characteristics in the cured foam. Smaller particle sizes, for example, tend to provide foams having more uniform cell structure.

In some formulations, it may be desirable to also use a blowing agent activator or accelerator so as to lower the temperature at which release of gas from the blowing agent takes place. Suitable blowing agent activators include, but are not limited to, ureas (such as the surface-coated, oil-treated urea sold by Uniroyal Chemicals under the trademark BIKOT) polyols, organic acids, amines, and lead, zinc, tin, calcium and cadmium oxides and salts (including carboxylic acid salts). Typically, from about 0.1% to about 2% blowing agent activator based on the weight of the foamable composition is employed, although the optimum amount will of course vary depending upon the activator/accelerator selected, the amount of blowing agent, cure temperature and other variables. Excess activator should not be used since the storage stability may thereby be adversely affected.

It will be especially desirable to include one or more glass fillers in the foamable composition, as such fillers impart useful characteristics to the resulting structural reinforcement foam. For example, hollow glass microspheres may be added to reduce the density of the foam while maintaining good strength and stiffness. Commercially available hollow glass microspheres (sometimes also referred to as glass microballoons or microbubbles) include the materials sold by Minnesota Mining & Manufacturing under the trademark SCOTCHLITE, with suitable grades including those available under the designations B38, C15, K20, and VS 5500. The glass microspheres preferably have diameters in the range of from about 5 to 200 micrometers (preferably, no greater than 70 micrometers). The crush strength of the hollow glass microspheres may be selected in accordance with the desired characteristics of the cured thermoset foam or reinforced structural member containing such foam. In a particularly desirable embodiment of the invention, hollow glass microspheres comprise from about 5 to about 50 percent by weight of the foamable composition. Glass fiber is another preferred type of glass filler, since it helps increase the strength and stiffness of the standard reinforcement foam. The glass fiber may be chopped, milled, or in other suitable physical form.

Other types of fillers may also optionally be present in the foamable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers other than glass fibers (e.g., wollastonite fibers, carbon fibers, ceramic fibers, aramid fibers), alumina, clays, sand, metals (e.g. aluminum powder), microspheres other than glass microspheres such as ceramic microspheres, thermoplastic resin microspheres, thermoset resin microspheres, and carbon microspheres (all of which may be solid or hollow, expanded or expandable) and the like.

Other optional components include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers, rubbers including liquid nitrile rubbers such as butadiene-acrylonitrile copolymers, which may be functionalized with carboxy groups, amine groups or the like), coupling agents/wetting agents/adhesion promoters (e.g., silanes), colorants (e.g., dyes and pigments such as carbon black), stabilizers (e.g., antioxidants, UV stabilizers) and the like.

Methods of preparing structural foam are well-known in the industry. To obtain the corrosive resistant foams of the present invention, simply add the organometallate compounds at any point of the known processes.

For a preferred method of making a one-part epoxy resin structural foam, an epoxy resin, a rubber, the organometallate compound(s), and an optional silane are admixed to form Mixture 1. Then, glass microspheres and/or glass fiber, blowing agent, fumed silica, calcium carbonate, colorant, curative(s) and urea (accelerator for blowing agent) are admixed to Mixture 1. More preferably, the glass microspheres/fiber and the blowing agent are admixed together to form Mixture 2. Then, Mixture 2 and Mixture 1 are admixed together before admixing the remaining ingredients.

Alternatively, resin and the organometallate compound(s) are admixed first, followed by blowing agent, glass microspheres and glass fibers. Thereafter, rubber, curing agent, accelerator, urea and fumed silica are added. For one improvement, resin and organometallate compound(s) are admixed first, followed by blowing agent and glass microspheres. Thereafter, rubber, curative(s), urea, fumed silica and glass fibers are added. Adding the glass fiber last produced better results for some applications of the structural foam.

Once all of the ingredients are together, the dough is vacuumed to remove air. The preferred finished product has the consistency of dough for easier handling. The dough may be shaped by extrusion or by hand or other means into any desired configuration. A quantity of the dough can, for example, be placed into the appropriate cavity of a metal part. The foamable composition is foamed and cured by heating, preferably to at least about 250° F. (about 120° C.), more preferably at least about 300° F. (about 150° C.).

The foamable compositions of the present invention may be utilized in any end-use application where a relatively light-weight, yet strong, thermoset foam is needed. However, the foamable compositions are especially useful in the production of automobiles and other vehicles to maintain or increase the strength of structural members such as rockers, pillars, radiator support beams, doors, reinforcing beams and the like. The use of structural foams in such applications is described, for example, in U.S. Pat. Nos. 4,901,500; 4,908,930; 4,751,249; 4,978,562; 4,995,545; 5,124,186; 5,575,526; 5,755,486; 4,923,902; 4,922,596; 4,861,097; 4,732,806; 4,695,343; and 4,610,836 (each of which is incorporated herein by reference in its entirety).

EXAMPLES

Example 1–3

The components listed in Table 1 were combined to provide a foamable composition in accordance with the present invention. Lap shear was tested under SAEJ1523 standards using 1 mm thick samples.

In Example 1, the resulting dough was tested under European testing conditions (PDA test and Volkswagen test) to determine adhesion to metal. A 1"×1"×0.040" sample of Example 1 was placed between each of eight sets of 0.06"× 1"×4" samples of cold-rolled steel (CRS) and five sets of 0.04"×1"×4" samples of hot-dipped galvanized steel (HDG). For the CRS samples, three sets were cured in the presence of metal spacers while five sets were cured in the presence of paper clips. Each sample was heated at 350° F. (177° C.).

Example 2 was tested using the method described above, but under General Motors 9505 Cycle G @ 30 cycles. The control samples (foamable compositions having compositions analogous to those of Examples 1–3, but which did not contain any organometallate compounds) had initial lap shear of between about 900–1000 psi. However, the control samples fell apart after the General Motors cycling test so that post-cycle lap shear data could not be obtained. Therefore, it was surprising that any data could be measured at all for the test samples prepared using the foamable compositions of the present invention. Accordingly, a post-cycle lap shear of 850 psi is a vast improvement over the control samples.

Example 3 was identical in composition to Example 2 and was also tested using the aforedescribed General Motors cycling test.

Examples 4–10

The components listed in Table 2 were combined to provide foamable compositions. Examples 5–8 and 10 illustrate the present invention wherein one or more organometallate compounds were employed, whereas Examples 4 and 9 are comparative examples prepared in the absence of any organometallate compound. In these examples, lap shear was measured on ⅛$^{th}$ inch thickness samples before cycling. The 3 point bend measurement refers to a test for flexural strength wherein a sample is placed between two supports and an opposing pressure is exerted on a point between the two supports.

The data shown in Table 2 demonstrate that improvements in the flexural strength and lap shear of the structured reinforcement foam are obtained when at least one titanate, zirconate, or silane is present. However, a synergistic improvement was achieved in Example 8 when an organic zirconate and two different types of organic titanates were present at the same time. Example 8 exhibited the second highest flexural strength and the highest lap shear of all the samples tested in this series.

Although Example 5 contained about twice the amount of each of the same three organometallates as in Example 8, Example 8 exhibited better flexural strength and lap shear than Example 5. At the same time, however, Example 5 had better flexural strength and lap shear than the control Example 4. Thus, the comparison between Example 5 and 8 indicates that increasing the amounts of the organometallate compounds does not necessarily provide further improvements in physical properties. Therefore, foam properties may be optimized at some intermediate organometallate concentration, which may be readily determined for any particular type of foamable composition by routine experimentation.

While the addition of silane in Example 9 improved both lap shear and flexural strength as compared to control Example 4, the standard reinforcement foam produced in Example 9 bent the substrate (metal panel) to which it was adhered as the foam shrunk. The same phenomenon was also observed in Example 10, which used a single organometallate compound.

One must note that any improvement in the initial lap shear or the 3 point bend results achieved by the addition of one or more organometallate compounds is a bonus. The primary advantage of using such compounds is an improvement in the post-cycling lap shear results, which correlates with increased corrosion resistance.

Examples 11–19

The components listed in Table 3 were combined to provide foamable compositions in accordance with the present invention wherein the amounts of the blowing agent and nitrile rubber (flexibilizing/toughening agent) were varied. Each of the examples also contained the following components: 1.3 wt % CAB-O-SIL TS-720 silica, 0.6 wt % AJICURE PN-23 amine-epoxy adduct curative, 0.4 wt % BIK OT urea blowing agent accelerator, 0.5 wt % KEN-REACT KR-55 organic titanate, 0.2 wt % KEN-REACT NZ-37 organic zirconate, and 0.2 wt % KEN-REACT 238M organic titanate.

The data obtained for these examples show that significant changes in lap shear and flexural strength do not take place when the blowing agent and toughening/flexibilizing agent contents are varied within the ranges tested. Example 19 was used as a "control" or reference sample for purposes of this comparison. The amounts of blowing agent and toughening/flexibilizing agent used in Example 12 provided an optimum flexural strength balanced by a minimal decrease in lap shear.

Examples 20–28

The series of foamable compositions in Table 4 was prepared and tested using the procedures set forth in Examples 4–10 to determine the effects of using a finer grade of dicyandiamide curative (DICY CG325) and varying the levels of silica, glass fiber and glass microspheres. Each composition contained 0.4 wt % BIK OT urea blowing agent accelerator, 0.5 wt % KEN-REACT KR-55 organic titanate (except for Example 24, which contained 0.4 wt % KEN-REACT KR-55), 0.2 wt % KEN-REACT NZ37 organic zirconate, and 0.2 wt % KEN-REACT KR238M organic titanate, in addition to the components listed in Table 4. The structural reinforcement foam obtained in Example 24 possessed particularly good physical properties as compared to the "control" (Example 28).

Examples 29–33

The series of foamable compositions in Table 5 was prepared and tested using the procedures set forth in Examples 4–10 to determine the effect of varying the amount of fumed silica in the formulation. Each composition contained 0.5 wt % AJICURE PN-23 amine-epoxy adduct curative, 0.2 wt % CELOGEN AZ-120 blowing agent, 0.4 wt % KEN-REACT KR-55 organic titanate, 0.2 wt % KEN-REACT NZ37 organic zirconate and 0.2 wt % KEN-REACT KR238M organic titanate, in addition to the components listed in Table 5. Example 31 exhibited the best flexural strength and lap shear as compared to the "control" (Example 29).

Example 34–38

The examples set forth in Table 6 demonstrate that the order in which the components of the foamable composition are combined can improve foam properties for certain applications. For Examples 34 and 36, the epoxy resins and organometallate compounds were mixed together first. Next, blowing agent, glass microspheres and glass fibers were admixed to the epoxy resin/organometallate compound mixture. Rubber, curatives, urea and fumed silica were added last to the mixture. Examples 35 and 37 varied from Examples 34 and 36 in that the glass fiber was added with the lastly added components instead of with the second group of components. Adding the glass fiber last produced structural reinforcement foams having improved flexural strength, as measured by the 3 point bend test.

TABLE 1

| Component | Identity | Supplier | Ex. 1 Wt. % | Ex. 2 Wt. % | Ex. 3 Wt. % |
|---|---|---|---|---|---|
| Epoxy Resins | PEP 6134 | Peninsula Polymers | 36.4 | 36.94 | 36.94 |
| | ARALDITE 6060 | Ciba | 19.6 | 19.89 | 19.89 |
| Curatives | | | | | |
| Dicyandiamide | DICY 200X | Air Products | 4.24 | — | — |
| | DICY CGNA | Air Products | — | 4.3 | 4.3 |
| Amine-Epoxy Adduct | AJICURE PN-23 | Ajinomoto | 1.07 | 1.09 | 1.09 |
| Blowing Agents | | | | | |
| Sulfonyl Hydrazide | CELOGEN OT | Uniroyal | 0.97 | 0.99 | 0.99 |
| Diaza-carbonamide | CELOGEN AZ120 | Uniroyal | 0.97 | 0.99 | 0.99 |
| Urea Blowing Agent Activator | BYK OT | Uniroyal | 0.56 | 0.57 | 0.57 |
| Organometallates | | | | | |
| Titanates | KEN-REACT KR-55 | Kenrich Petrochemicals | 0.10 | 0.1 | 0.1 |
| | KEN-REACT 238M | Kenrich Petrochemicals | 0.19 | 0.2 | 0.2 |
| Zirconate | KEN-REACT NZ-37 | Kenrich Petrochemicals | 0.10 | 0.1 | 0.1 |
| Fillers | | | | | |
| Calcium Carbonate | ULTRA PFLEX | Pfizer | 4.68 | 4.75 | 4.75 |
| Silica | CAB-O-SIL TS-720 | Cabot | 3.46 | 3.51 | 3.51 |
| Glass Microspheres | B-38/V5 5500 | 3M | 21.84 | 22.16 | 22.16 |
| Aluminum Powder | | Reynolds | 1.46 | — | — |
| Colorants | | | | | |
| Carbon Black | MONARCH 120 | Cabot | 0.13 | 0.13 | 0.13 |
| Pthalocyanine | 626 Blue | | 0.01 | — | — |
| Toughening/ | Nipol 1312 | Zeon | 4.22 | 4.28 | 4.28 |

TABLE 1-continued

| Component | Identity | Supplier | Ex. 1 Wt. % | Ex. 2 Wt. % | Ex. 3 Wt. % |
|---|---|---|---|---|---|
| Flexibilizing Agent Properties | | | | | |
| Uncured Specific Gravity | | | 0.79 | — | 0.79 |
| Cured Specific Gravity | | | 0.48 | — | 0.46 |
| % Expansion | | | 65 | — | 71 |
| Initial Shear, psi | | | 936 | 975 | 943 |
| Cycled Shear, psi | | | — | 850 | — |

TABLE 2

| Component | Identity | Supplier | Ex. 4* Wt. % | Ex. 5 Wt. % | Ex. 6 Wt. % | Ex. 7 Wt. % | Ex. 8 Wt. % | Ex. 9* Wt. % | Ex. 10 Wt. % |
|---|---|---|---|---|---|---|---|---|---|
| Epoxy Resin | DER 331 | Dow Chemical | 45 | 44.0 | 44.5 | 44.5 | 44.5 | 44.5 | 44.5 |
| Curatives | | | | | | | | | |
| Dicyandiamide | DICY CGNA | Air Products | 3.7 | 3.7 | 3.7 | 3.7 | 3.7 | 3.7 | 3.7 |
| Amine-Epoxy Adduct | AJICURE PN-23 | Ajinomoto | 0.6 | 0.6 | 0.6 | 0.6 | 0.6 | 0.6 | 0.6 |
| Blowing Agents | | | | | | | | | |
| Diazacarbonamide | CELOGEN AZ120 | Uniroyal | 1.2 | 1.2 | 1.2 | 1.2 | 1.2 | 1.2 | 1.2 |
| Urea Blowing Agent Activator | BIK OT | Uniroyal | 0.4 | 0.4 | 0.4 | 0.4 | 0.4 | 0.4 | 0.4 |
| Organometallate | | | | | | | | | |
| Titanates | KEN-REACT KR-55 | Kenrich Petrochemicals | — | 0.9 | 0.9 | — | 0.5 | — | — |
| | KEN-REACT 238M | Kenrich Petrochemicals | — | 0.5 | — | 0.46 | 0.2 | — | — |
| | KEN-REACT LICA-38 | Kenrich Petrochemicals | — | — | — | — | — | — | 0.9 |
| Zirconate | KEN-REACT NZ-37 | Kenrich Petrochemicals | — | 0.5 | — | 0.46 | 0.2 | — | — |
| Silane | D6020 | Dow Chemical | — | — | — | — | — | 0.9 | — |
| Fillers | | | | | | | | | |
| Silica | CAB-O-SIL TS-720 | Cabot | 1.3 | 1.3 | 1.3 | 1.3 | 1.3 | 1.3 | 1.3 |
| Glass Fiber | — | — | 9.4 | 9.2 | 9.3 | 9.3 | 9.3 | 9.3 | 9.3 |
| Glass Microspheres | B-38/V5 5500 | 3M | 32.8 | 32.2 | 32.5 | 32.5 | 32.5 | 32.5 | 32.5 |
| Toughening/Flexibilizing Agent | Nipol 1312 | Zeon | 5.6 | 5.6 | 5.6 | 5.6 | 5.6 | 5.6 | 5.6 |
| Nitrile Rubber | | | | | | | | | |
| Properties | | | | | | | | | |
| Lap Shear, psi | | | 136 | 214 | 146 | 174 | 267 | 152 | 173 |
| 3 Point Bend, psi | | | 42.7 | 48.7 | 49.7 | 48.3 | 55 | 56.7 | 54.7 |

*Comparative example

TABLE 3

| Component | Identity | Supplier | Ex. 11 Wt. % | Ex. 12 Wt. % | Ex. 13 Wt. % | Ex. 14 Wt. % | Ex. 15 Wt. % | Ex. 16 Wt. % | Ex. 17 Wt. % | Ex. 18 Wt. % | Ex. 19 Wt. % |
|---|---|---|---|---|---|---|---|---|---|---|---|
| Epoxy Resins | PEP 6134 | Peninsula Polymers | 22.7 | 22.5 | 22.1 | 21.9 | 22.4 | 22.3 | 22.2 | 22.2 | 22.2 |
| | DER 331 | Dow Chemical | 22.7 | 22.5 | 22.1 | 21.9 | 22.4 | 22.3 | 22.2 | 22.2 | 22.2 |
| Additional Curative Dicyandiamide | DICY CGNA | Air Products | 3.8 | 3.7 | 3.7 | 3.6 | 3.7 | 3.7 | 3.7 | 3.7 | 3.7 |
| Blowing Agent Diazacarbonamide | CELOGEN AZ-120 | Uniroyal | 1.2 | 1.2 | 1.2 | 1.2 | 0.7 | 0.9 | 1.4 | 1.6 | 1.3 |
| Additional Fillers | | | | | | | | | | | |
| Glass Fiber | — | — | 9.5 | 9.4 | 9.2 | 9.1 | 9.3 | 9.3 | 9.3 | 9.2 | 9.2 |
| Glass Microspheres | B-38/V5 5500 | 3M | 33.1 | 32.8 | 32.2 | 31.9 | 32.7 | 32.6 | 32.4 | 32.4 | 32.4 |
| Toughening/Flexibilizing Agent | NIPOL 1312 | Zeon | 3.8 | 4.7 | 6.4 | 7.3 | 5.6 | 5.6 | 5.6 | 5.5 | 5.5 |

TABLE 3-continued

| Component | Identity | Supplier | Ex. 11 Wt. % | Ex. 12 Wt. % | Ex. 13 Wt. % | Ex. 14 Wt. % | Ex. 15 Wt. % | Ex. 16 Wt. % | Ex. 17 Wt. % | Ex. 18 Wt. % | Ex. 19 Wt. % |
|---|---|---|---|---|---|---|---|---|---|---|---|
| Properties |  |  |  |  |  |  |  |  |  |  |  |
| Lap Shear, psi |  |  | 167 | 162 | 157 | 178 | 180 | 190 | 175 | low | 180 |
| 3 Point Bend, psi |  |  | 27 | 31 | 20 | 26 | 29 | 29 | 26 | 28 | 29 |

TABLE 4

| Component | Identity | Supplier | Ex. 20 Wt. % | Ex. 21 Wt. % | Ex. 22 Wt. % | Ex. 23 Wt. % | Ex. 24 Wt. % | Ex. 25 Wt. % | Ex. 26 Wt. % | Ex. 27 Wt. % | Ex. 28 Wt. % |
|---|---|---|---|---|---|---|---|---|---|---|---|
| Epoxy Resins | PEP 6134 | Peninsula Polymers | 22.5 | 23 | 23.6 | 22 | 21.5 | 22.3 | 22.2 | 22.6 | 22.5 |
|  | DER 331 | Dow Chemical | 22.5 | 23 | 23.6 | 22 | 21.5 | 22.3 | 22.2 | 22.6 | 22.5 |
| Curatives |  |  |  |  |  |  |  |  |  |  |  |
| Dicyandiamide | DICY CGNA | Air Products | — | — | — | — | — | — | — | — | 3.7 |
|  | DICY CG 325 | Air Products | 3.7 | 3.8 | 3.9 | 3.7 | 3.6 | 3.7 | 3.7 | 3.8 | — |
| Amine-Epoxy Adduct | AJICURE PN-23 | Ajinomoto | 0.6 | 0.6 | 0.6 | 0.5 | 0.5 | 0.6 | 0.6 | 0.6 | 0.6 |
| Blowing Agent Diazacarbonamide | CELOGEN AZ-120 | Uniroyal | 1.3 | 1.3 | 1.4 | 1.3 | 1.2 | 1.3 | 1.3 | 1.3 | 1.3 |
| Fillers |  |  |  |  |  |  |  |  |  |  |  |
| Silica | CAB-OSIL TS-720 | Cabot | 1.3 | 1.3 | 1.4 | 1.3 | 1.2 | 1.9 | 2.3 | 0.9 | 1.3 |
| Glass Microspheres | B-38/VS 5500 | 3M | 32.8 | 33.6 | 34.4 | 32 | 31.3 | 32.6 | 32.4 | 32.9 | 32.8 |
| Glass Fiber | — | — | 9.4 | 7.2 | 4.9 | 11.4 | 13.4 | 9.3 | 9.3 | 9.4 | 9.4 |
| Toughening/Flexibilizing Agent | NIPOL 1312 | Zeon | 4.7 | 4.8 | 4.8 | 4.6 | 4.5 | 4.7 | 4.6 | 4.7 | 4.7 |
| Lap Shear, psi |  |  | 215 | 204 | 166 | 212 | 266 | 154 | 234 | 181 | 168 |
| 3 Point Bend, psi |  |  | 31.6 | 28 | 28.4 | 33.7 | 72 | 43.4 | 36.8 | 38 | 34.6 |

TABLE 5

| Component | Identity | Supplier | Ex. 29 Wt. % | Ex. 30 Wt. % | Ex. 31 Wt. % | Ex. 32 Wt. % | Ex. 33 Wt. % |
|---|---|---|---|---|---|---|---|
| Epoxy Resins | PEP 6134 | Peninsula Polymers | 21.5 | 21.4 | 21.3 | 21.3 | 21.2 |
|  | DER 331 | Dow Chemical | 21.5 | 21.4 | 21.3 | 21.3 | 21.2 |
| Additional Curative | DICY CG 325 | Air Products | 3.6 | 3.6 | 3.6 | 3.5 | 3.5 |
| Fillers |  |  |  |  |  |  |  |
| Silica | CAB-O-SIL TS-720 | Cabot | 1.2 | 1.5 | 1.8 | 2.2 | 2.6 |
| Glass Microspheres | B-38/VS 5500 | 3M | 31.3 | 31.2 | 31.1 | 31 | 30.9 |
| Glass Fiber | — | — | 13.4 | 13.4 | 13.3 | 13.3 | 13.2 |
| Blowing Agent Activator | BIK OT | Uniroyal | 0.4 | 0.4 | 0.4 | 0.3 | 0.3 |
| Toughening/Flexibilizing Agent | NIPOL 1312 | Zeon | 4.5 | 4.5 | 4.4 | 4.4 | 4.4 |
| Lap Shear, psi |  |  | 120 | 150 | 163 | 140 | 100 |
| 3 Point Bend, psi |  |  | 40 | 38 | 55.4 | 26 | 20 |

TABLE 6

| Component | Identity | Supplier | Ex. 34 Wt. % | Ex. 35 Wt. % | Ex. 36 Wt. % | Ex. 37 Wt. % | Ex. 38* Wt. % |
|---|---|---|---|---|---|---|---|
| Epoxy Resins | PEP 6134 | Peninsula Polymers | 21.3 | 21.3 | 21.3 | 21.3 | 21.5 |
|  | DER 331 | Dow Chemical | 21.3 | 21.3 | 21.3 | 21.3 | 21.5 |
| Curatives |  |  |  |  |  |  |  |
| Dicyandiamide | DICY CG 325 | Air Products | 3.6 | 3.6 | 3.5 | 3.5 | 3.6 |
| Amine-Epoxy Adduct | AJICURE PN-23 | Ajinomoto | 0.5 | 0.5 | 0.5 | 0.5 | 1.8 |

TABLE 6-continued

| Component | Identity | Supplier | Ex. 34 Wt. % | Ex. 35 Wt. % | Ex. 36 Wt. % | Ex. 37 Wt. % | Ex. 38* Wt. % |
|---|---|---|---|---|---|---|---|
| Blowing Agent | CELOGEN AZ120 | Uniroyal | 1.2 | 1.2 | 1.2 | 1.2 | 1.3 |
| Blowing Agent Accelerator | BIK OT | Uniroyal | 0.4 | 0.4 | 0.4 | 0.4 | 1.3 |
| Fillers | | | | | | | |
| Silica | CABO-SIL TS-720 | Cabot | 1.8 | 1.8 | 1.8 | 1.8 | 1.8 |
| Glass Fiber | — | — | 13.3 | 13.3 | 13.3 | 13.3 | 13.5 |
| Glass Microspheres | B-38/V5 5500 | 3M | 31.1 | 31.1 | 31.1 | 31.1 | 31.4 |
| Flexibilizing/Toughening Agent | NIPOL 1312 | Zeon | 4.4 | 4.4 | 4.4 | 4.4 | 4.5 |
| Organometallates | | | | | | | |
| Titanates | KEN-REACT KR-55 | Kenrich Petrochemicals | 0.4 | 0.4 | 0.4 | 0.4 | — |
| | KEN-REACT 238M | Kenrich Petrochemicals | 0.2 | 0.2 | 0.2 | 0.2 | — |
| Zirconate | KEN-REACT NZ-37 | Kenrich Petrochemicals | 0.2 | 0.2 | 0.4 | 0.4 | — |
| 3 Point Bend, psi | | | 29.2 | 40 | 30 | 40 | 32 |

*Comparative example

What is claimed is:

1. A foamable composition comprising
   a) one or more thermosettable synthetic resins;
   b) one or more curatives;
   c) one or more blowing agents; and
   d) one or more organometallate compounds selected from the group consisting of organic titanates and organic zirconates in an amount effective to reduce corrosion of a metal surface in contact with a foam produced from said foamable composition as compared to a foam produced from an analogous foamable composition not containing any of said organometallate compounds.

2. The foamable composition of claim 1 comprising at least one organic titanate and at least one organic zirconate.

3. The foamable composition of claim 1 comprising at least one organic titanate which is an amine adduct of a tetrasubstituted titanate.

4. The foamable composition of claim 1 comprising at least one organic titanate containing a phosphorus-containing substituent bonded to titanium.

5. The foamable composition of claim 1 comprising at least one organic titanate or organic zirconate containing at least one neoalkoxy substituent bonded to titanium or zirconium.

6. The foamable composition of claim 1 comprising at least one organic titanate which is a phosphite adduct of a tetrasubstituted titanate.

7. The foamable composition of claim 1 comprising,
   a) at least one organic titanate selected from the group consisting of amine adducts of tetrasubstituted titanates and organic titanates containing at least one phosphato or pyrophosphato substituent bonded to titanium;
   b) at least one organic titanate different from the organic titanate of (a) selected from the group consisting of organic titanates containing at least one neoalkoxy substituent bonded to titanium and phosphite adducts of tetrasubstituted titanates; and
   c) at least one organic zirconate selected from the group consisting of organic zirconates containing at least one neoalkoxy substituent bonded to zirconium and organic zirconates containing at least one benzoate substituent or derivative thereof bonded to zirconium.

8. The foamable composition of claim 1 wherein at least one of the thermosettable synthetic resins is an epoxy resin.

9. The foamable composition of claim 1 wherein at least one of the thermosettable synthetic resins is a glycidyl ether of a polyhydric phenol.

10. The foamable composition of claim 1 wherein at least one of the blowing agents is a chemical blowing agent.

11. The foamable composition of claim 1 wherein at least one of the curatives is a nitrogen-containing compound.

12. The foamable composition of claim 1 additionally comprising hollow glass microspheres.

13. The foamable composition of claim 1 additionally comprising at least one additive selected from the group consisting of fillers, flexibilizing/toughening agents, blowing agent activators, thixotropic/rheological control agents, colorants, silanes, and stabilizers.

14. The foamable composition of claim 1 wherein the organometallate compounds are present in an amount totalling from about 0.1 weight % to about 2 weight % based on the overall weight of the foamable composition.

15. A foam obtained by heating and curing the foamable composition of claim 1.

16. A composite comprised of a solid article and the foam of claim 15.

17. A foamable dough useful for producing a structural reinforcement foam, said foamable dough comprising
   a) from about 35 weight % to about 85 weight % of one or more epoxy resins, wherein at least one of said epoxy resins is a glycidyl ether of a polyhydric phenol;
   b) from about 0.5 weight % to about 10 weight % of one or more chemical blowing agents;
   c) from about 0.1 weight % to about 15 weight % of one or more curatives, wherein at least one of said curatives is a nitrogen-containing compound;
   d) one or more fillers, wherein from about 5 weight % to about 50 weight % of the foamable dough is comprised of hollow glass microspheres; and
   e) from about 0.1 weight % to about 2 weight % total of at least two different organometallate compounds selected from the group consisting of:
      (i) amine adducts of tetrasubstituted titanates;
      (ii) organic titanates containing at least one phosphato or pyrophosphato substituent bonded to titanium;
      (iii) organic titanates containing at least one neoalkoxy substituent bonded to titanium;
      (iv) phosphite adducts of tetrasubstituted titanates;
      (v) organic zirconates containing at least one neoalkoxy substituent bonded to zirconium; and
      (vi) organic zirconates containing at least one benzoate substituent or derivative thereof bonded to zirconium, wherein said organometallate compounds are present in an amount effective to reduce corrosion of a metal surface in contact with the structural reinforcement foam produced from said foamable dough as compared to a foam produced from an analogous foamable dough not containing any of said organometallate compounds.

18. The foamable dough of claim 17 comprising at least one organometallate compound from group (i) or (ii), at least one organometallate compound from group (iii) or (iv), and at least one organometallate compound from group (v) or (vi).

19. The foamable dough of claim 17 additionally comprising glass fibers.

20. The foamable dough of claim 17 wherein at least one of the chemical blowing agents is selected from the group consisting of azodicarbonamide and sulfonyl hydrazides.

21. The foamable dough of claim 17 wherein at least one of the curatives is dicyandiamide.

22. The foamable dough of claim 17 wherein a urea is present as a blowing agent activator.

23. The foamable dough of claim 17 additionally comprising at least one additive selected from the group consisting of flexibilizing/toughening agents, colorants, silanes, stabilizers, and thixotropic/rheological control agents.

24. The foamable dough of claim 17 wherein the polyhydric phenol is bisphenol A.

25. The foamable dough of claim 17 wherein the epoxy resins contain about 2 epoxy groups per molecule and have epoxy equivalent weights of from about 150 to about 1000.

26. A structural reinforcement foam obtained by heating and curing the foamable dough of claim 17.

27. A composite comprised of a ferrous article and the structural reinforcement foam of claim 26.

* * * * *